United States Patent [19]
Glennon

[11] Patent Number: 5,191,318
[45] Date of Patent: Mar. 2, 1993

US005191318A

[54] LOSS OF NEUTRAL DETECTING CIRCUIT
[75] Inventor: Oliver Glennon, Ballinasloe, Ireland
[73] Assignee: Square D Company, Palatine, Ill.
[21] Appl. No.: 727,017
[22] Filed: Jul. 8, 1991
[51] Int. Cl.$^5$ .............................................. G08B 21/00
[52] U.S. Cl. ..................... 340/635; 361/42; 340/652
[58] Field of Search ............... 340/635, 649, 650, 651, 340/652; 361/42, 45, 47–50; 324/509

[56] References Cited
U.S. PATENT DOCUMENTS
4,598,331 7/1986 Legatti .................................. 361/46
4,931,893 6/1990 Glennon et al. ...................... 361/45

Primary Examiner—Jin F. Ng
Assistant Examiner—Jeffery A. Hofsass
Attorney, Agent, or Firm—Kareem M. Irfan

[57] ABSTRACT

A loss of neutral detector is disclosed. The detector includes a closed loop circuit which has a charge storage device, an output device and a switch in a normally-open position. The switch is controlled by a switch control circuit operatively connected to a loss of neutral detection circuit. The loss of neutral detection circuit detects an electro-magnetic field generated around the neutral lead on increase of the neutral potential via a pull-up resistor on loss of neutral. On detection of loss of neutral, the switch is closed so that the charge storage device energizes the closed loop circuit to activate the output device.

7 Claims, 2 Drawing Sheets

LOSS OF NEUTRAL DETECTING CIRCUIT

BACKGROUND OF THE INVENTION

1. Field of the Invention

The present invention relates to a loss of neutral detector for an electrical distribution system.

2. Related Prior Art

At present, loss of neutral detection is carried out by circuit interrupters such as those described in British Patent Specification No. 2,000,398 (Hazemeyer) and U.S. Pat. No. 4,569,331 (Legatti). These circuit interrupters include a circuit breaker which is activated on detection of loss of neutral. To achieve this, an earth lead is used to take over the function of the neutral lead and it completes a path for activating current for the circuit breaker. However, there are many situations where an earth lead is not available and loss of neutral detectors which rely on use of an earth lead would not be suitable.

Presently available loss of neutral detectors which do not require an earth lead are circuit interrupters having a circuit breaker which is normally activated and is deactivated when a fault occurs. Such an arrangement has little versatility as output devices other than a circuit breaker may not be used.

SUMMARY AND OBJECTS OF THE INVENTION

It is an object of the invention to provide a loss of neutral detector which operates an output device on detection of loss of neutral without the need for an earth lead.

Another object is to provide a loss of neutral detector which a relatively simple loss of neutral detection circuit.

A still further object is to provide a loss of neutral detector which is reliable in operation and simple to manufacture.

According to the invention, there is provided a loss of neutral detector for use in a system having line and neutral leads. The detector comprises:
  line and neutral leads for connection in the system between an energy source and a load;
  a loss of neutral detection circuit comprising a pull-up connection between the line and neutral leads and an electro-magnetic field detector for detection of an electro-magnetic field generated around the neutral lead on increase of the neutral lead potential via the pull-up connection;
  a closed loop circuit;
  a charge storage device connected in the closed loop circuit;
  an output device connected in the closed loop circuit;
  a switch connected in the closed loop circuit in a normally-open position; and
  a control circuit for the switch operatively connected to the loss of neutral detection circuit for closing the switch on detection of loss of neutral to activate the output device.

BRIEF DESCRIPTION OF THE DRAWINGS

The invention will be more clearly understood from the following description of some preferred embodiments thereof, given by way of example only with reference to the accompanying drawings in which.

DETAILED DESCRIPTION OF THE PREFERRED EMBODIMENTS

Figure 1A:
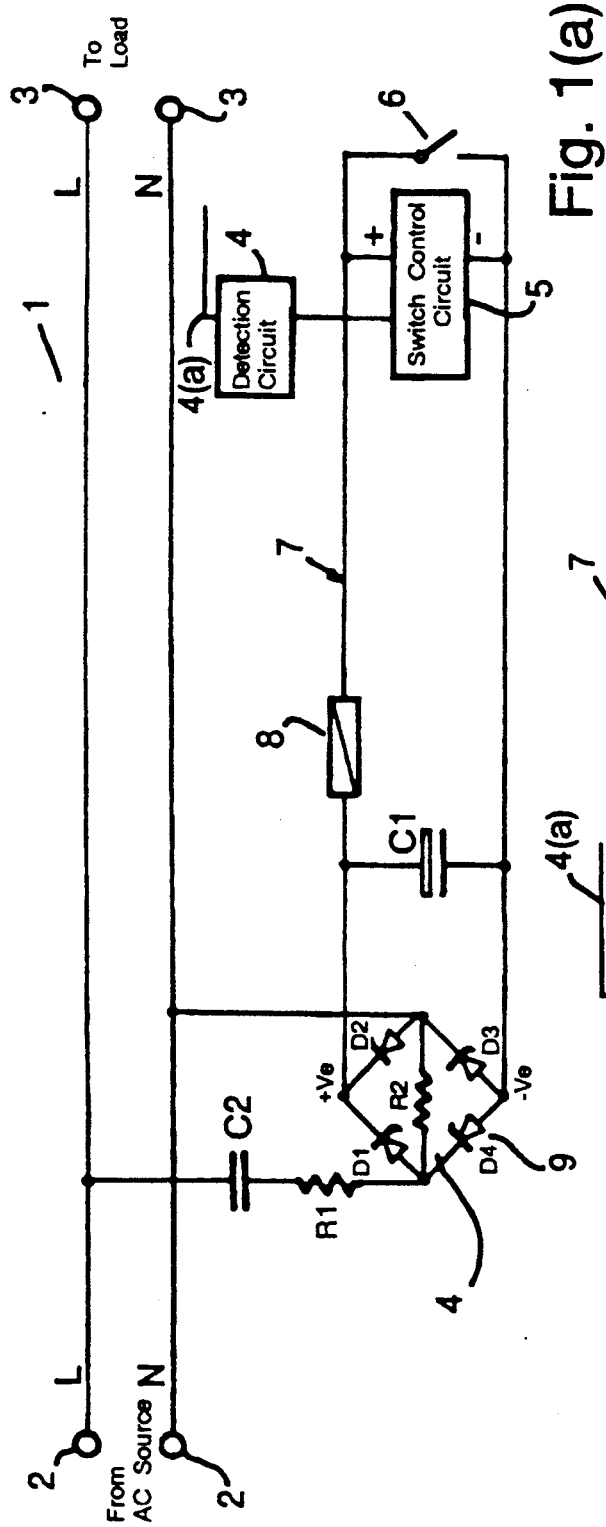
FIGS. 1(a) and 1(b) are an outline schematic representation of a loss of neutral detector of the invention, and a detailed view of a portion of the detector, respectively.
Figure 1B:
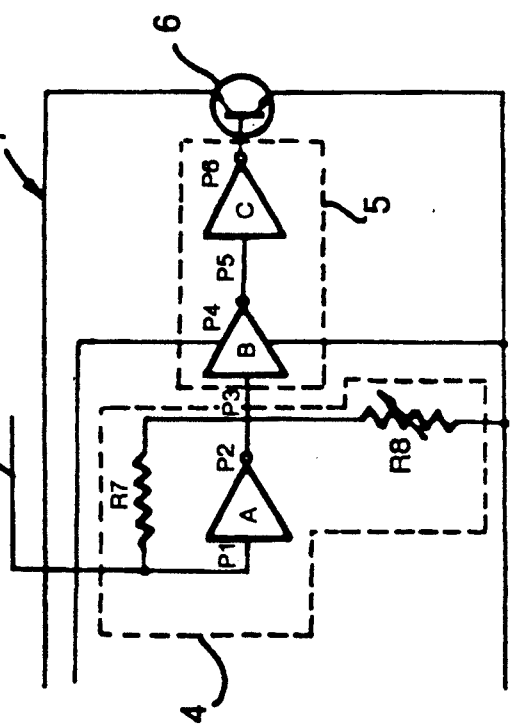

Referring to the drawings, and initially to FIGS. 1(a) and 1(b), there is illustrated a loss of neutral detector of the invention indicated generally by the reference numeral 1. The detector 1 comprises a line lead L and a neutral lead N between AC source terminals 2 and load terminals 3. The detector 1 also include a loss of neutral detection circuit 4 having an electro-magnetic detection lead 4(a) adjacent the neutral lead N. The loss of neutral detection circuit 4 is connected to a switch control circuit 5 for a switch 6 in a closed loop circuit 7. The closed loop circuit 7 also includes a solenoid 8 and a capacitor C1.

The closed loop circuit 7 is connected across the output of a DC power supply, namely, a full wave rectifier 9 having diodes D1, D2, D3 and D4. The input terminals of the full wave rectifier 9 are connected to the line lead L via a DC isolation capacitor C2 and a resistor R1, and directly to the neutral lead N. A pull-up resistor R2 forming part of the loss of neutral detection circuit 4 is connected across the input terminals of the full wave rectifier 9.

Referring specifically to FIG. 1(b), the loss of neutral detection circuit 4, the switch control circuit 5 and the switch 6 are illustrated in more detail. The loss of neutral detection circuit 4 (with the exception of the resistor R2) and the switch control circuit 5 are together formed by an integrated circuit having pins P1 to P6 as shown. The integrated circuit is a hex inverter having stages A, B and C. Stage A includes a feed-back resistor R7 for linear amplification of changes in the electro-magnetic field detected by the electro-magnetic detection lead 4(a). A variable resistor R8 sets the point at which the output from the stage A triggers the stages B and C. The switch 6 is a bipolar transistor, the base of which is triggered by the pin P6 of the output stage C.

In operation, the detector 1 is connected in an AC system having line and neutral leads using the source terminals 2 and the load terminals 3. The solenoid 8 is operatively connected to a separate alarm which may be visual or audible. Under normal conditions, the switch 6 is open as illustrated and the full wave rectifier 9 provides DC power for the detector. The DC power appears across the capacitor C1 and maintains the capacitor C1 in a charged state. If the neutral lead opens, its potential increases via the connection to the line lead L via the pull-up resistor R2. This results in generation of an electro-magnetic field around the neutral lead N while the increase is taking place. This electro-magnetic field induces a current in the detection lead 4(a) which appears at the input pin P1 of stage A of the hex inverter integrated circuit. According to the setting of the variable resistor R8, stages B and C trigger the base of the switch 6 to close the switch. When this happens, the capacitor C1 discharges in the closed loop circuit 7, thereby activating the solenoid 8. The solenoid 8, in turn, activates the alarm.

Figure 2:
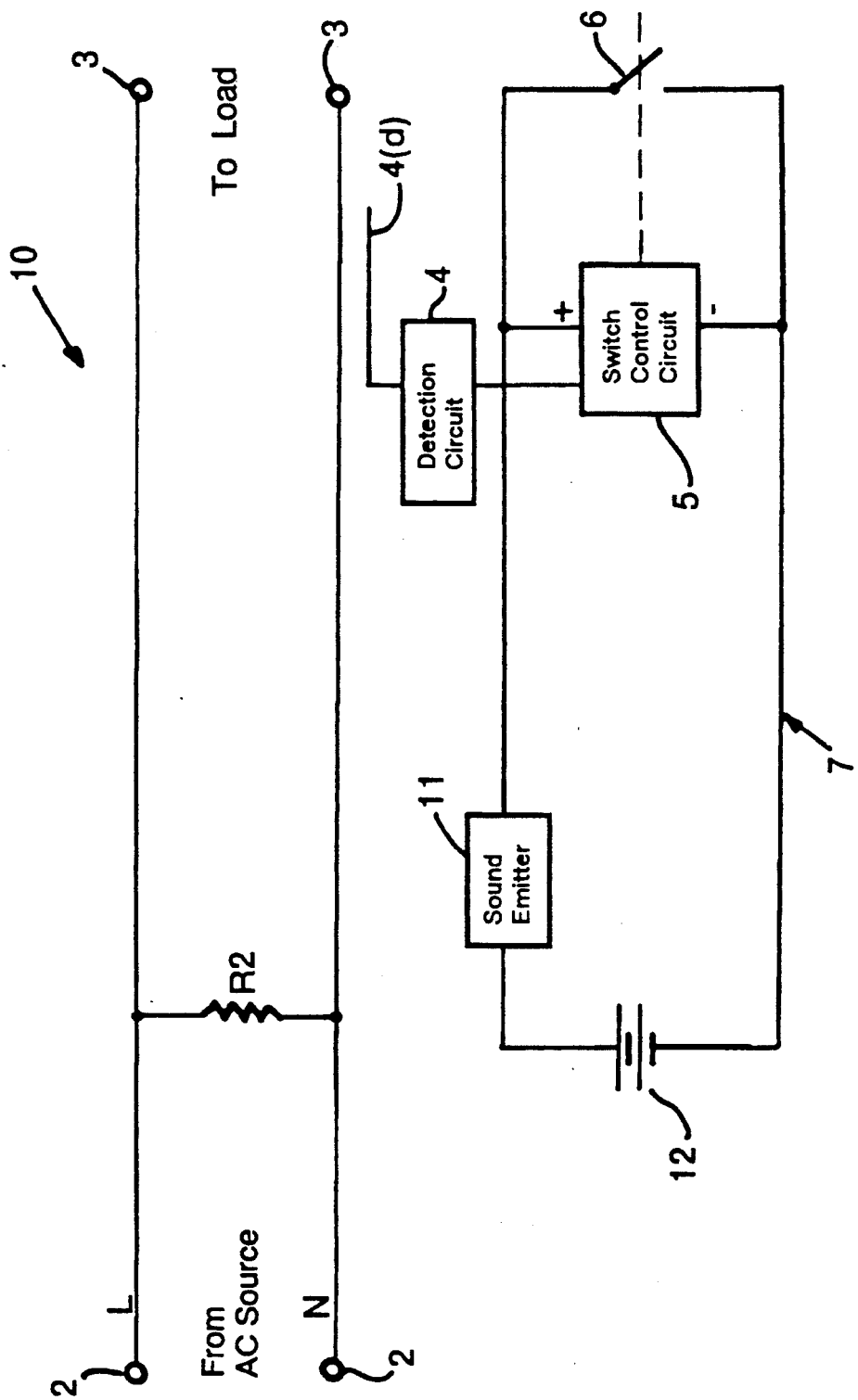
FIG. 2 is an outline schematic representation of an alternative construction of loss of neutral detector of the invention.

Referring now to FIG. 2, there is illustrated an alternative construction of loss of neutral detector of the invention, indicated generally by the reference numeral 10. Parts similar to those described with reference to FIG. 1 are identified by the same reference numerals. The pull-up resistor R2 is connected directly between the line lead L and the neutral lead N of the detector and there is no physical connection between the leads and the remainder of the detector. A charge storage device is in this embodiment a battery 12 connected in the closed loop circuit 7 and the output device is a sound emitter 11.

In operation, loss of neutral is detected in a manner similar to that of the detector 1. The battery 12 permanently stores charge. On loss of neutral, when the switch 6 is closed the closed loop circuit 7 is energized, thus activating the sound emitter 11 which outputs an alarm sound signal indicating loss of neutral.

It will thus be appreciated that the invention provides a simple detector which detects loss of neutral and outputs a warning signal either directly or via an auxiliary alarm circuit. The detector is relatively simple because of the construction of loss of neutral detection circuit, all of which is on a single integrated circuit. Because there is no need for an earth lead, the detector is versatile in use.

It is envisaged that any type of output device other than the sound emitter 11 or the solenoid 8 could be used. For example, a lamp may be connected in the closed loop circuit either instead of or in addition to either of the output devices described above.

What is claimed is:

1. A loss of neutral detector for use in a system having line and neutral leads, the detector comprising:
   a) line and neutral leads for connection in the system between energy source and a load;
   b) a loss of neutral detection circuit comprising a pull-up connection between the line and neutral leads and an electro-magnetic field detector for detection of an electro-magnetic field generated around the neutral lead on increase of the neutral lead potential via the pull-up connection;
   c) a closed loop circuit;
   d) a charge storage device connected in the closed loop circuit;
   e) an output device connected in the closed loop circuit;
   f) a switch connected in the closed loop circuit in a normally open position; and
   g) a control circuit for the switch operatively connected to the loss of neutral detection circuit for closing the switch on detection of loss of neutral to activate the output device.

2. A loss of neutral detector as recited in claim 1, wherein the charge storage device is a battery.

3. A loss of neutral detector as recited in claim 2, wherein the output device is a sound emitter.

4. A loss of neutral detector as recited in claim 2, wherein the output device is a lamp.

5. A loss of neutral detector as recited in claim 2, wherein the output device is a solenoid.

6. A loss of neutral detector as recited in claim 1, wherein the charge storage device is a capacitor and the detector further comprises a DC power supply connected to the line and neutral leads, the capacitor being connected across the output of the DC power supply.

7. A loss of neutral detector as recited in claim 6, wherein the output device is a solenoid.

* * * * *